Figure 1:
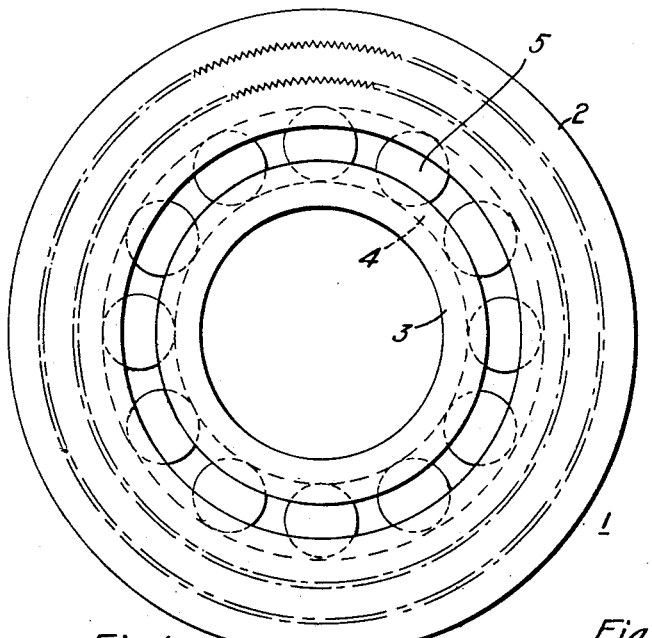

Oct. 28, 1924.

R. E. TALLEY 1,513,295

INSULATED BEARING

Filed Feb. 15, 1919

WITNESSES:
H. T. Shelhamer
O. E. Bee.

INVENTOR
Randal E. Talley
BY
Wesley G. Carr
ATTORNEY

Patented Oct. 28, 1924.

1,513,295

UNITED STATES PATENT OFFICE.

RANDAL E. TALLEY, OF IRWIN, PENNSYLVANIA, ASSIGNOR TO WESTINGHOUSE ELECTRIC & MANUFACTURING COMPANY, A CORPORATION OF PENNSYLVANIA.

INSULATED BEARING.

Application filed February 15, 1919. Serial No. 277,154.

*To all whom it may concern:*

Be it known that I, RANDAL E. TALLEY, a citizen of the United States, and a resident of Irwin, in the county of Westmoreland and State of Pennsylvania, have invented a new and useful Improvement in Insulated Bearings, of which the following is a specification.

My invention relates to insulated bearings and more particularly to ball-bearing races such as are employed in dynamo-electric machines. The primary object of my invention is to construct bearings that may be employed in electric machines without injurious effects upon the bearing balls on account of the circulation of electric currents.

Heretofore, difficulty has been experienced in obtaining bearings for some dynamo-electric machines on account of the fact that stray fields and consequent circulating currents reduce the life of the bearings by pitting or otherwise injuring the bearing surfaces. In view of this, one object of my invention is to construct bearings which may be insulated so as to prevent circulation of electric currents caused by stray fields.

Another object of my invention is to provide insulated bearings by incorporating in the bearings a material possessing a high dielectric strength and which shall insure great mechanical strength in the composite bearing.

Another object of my invention is to provide insulation for bearings which may be employed in uniting metal parts and which shall insure permanent adhesion of the united parts.

With these and other objects in view, my invention will be more fully described, illustrated in the drawings, in the several views of which corresponding numerals indicate like parts, and then particularly pointed out in the claims.

Figure 2:
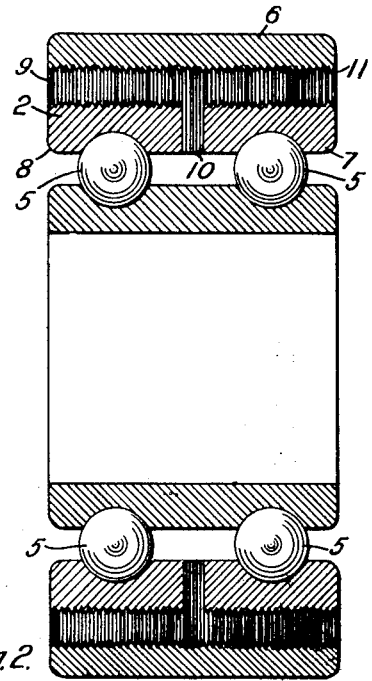
Figure 3:
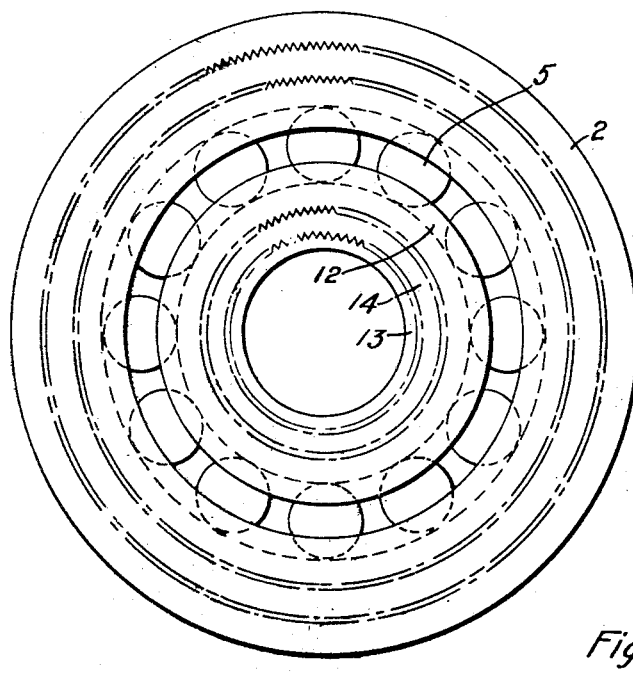
Figure 4:
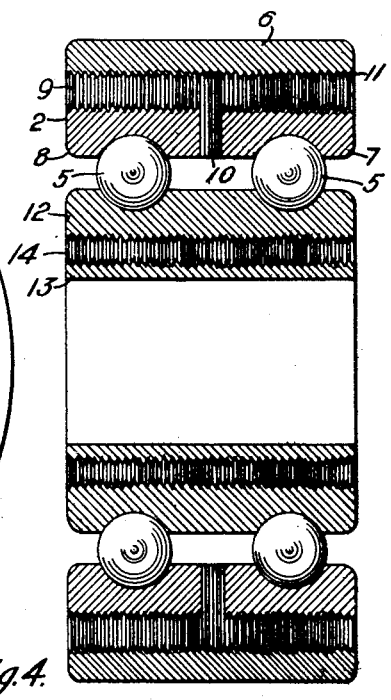

In the drawings, Fig. 1 is a side elevation of a bearing constructed in accordance with my invention; Fig. 2 is a diametral sectional view of the bearing shown in Fig. 1; Fig. 3 is a side elevation of a bearing embodying a modification of my invention, and Fig. 4 is a diametral sectional view of the bearing shown in Fig. 3.

In practising my invention, I may construct a bearing by employing an interior and an exterior race suitably grooved to receive bearing balls. I may insulate the exterior race by forming it of a plurality of metallic rings united with fibrous material impregnated with a suitable binder. The fibrous material may be in the form of stacked punchings of suitable diameter impregnated with a binder in a dry or intermediate state. The metallic rings may be assembled about such material and the assembled body may be subjected to heat and pressure in a suitable mold to compact the material and to harden the binder.

The inner race of the bearing may be insulated in the same manner as the exterior race, if deemed desirable. The particular construction of the bearing depends, to a great extent, upon the particular machine in which it is to be employed. For example, it has been found that bearings may be employed in some dynamo-electric machines without injurious effects upon the bearing surfaces while, in others, the life of the bearing is considerably reduced by pitting or roughening of the bearing surfaces caused by circulating currents. It is obvious, therefore, that the construction of a bearing must vary somewhat to meet the requirements of the machine in which it is to be used.

Referring to the drawings, in Fig. 1 is shown a bearing 1 comprising an exterior race 2 and an inner race 3 which have opposed face grooves 4 adapted to receive bearing balls 5. As here shown, the exterior race 2 may be constructed by employing a plurality of metallic rings 6, 7 and 8 and uniting them with insulating material 9. The insulating material 9 may comprise fibrous material, such as muslin, paper or duck, impregnated with a suitable binder such, for example, as a phenolic condensation product. The fibrous material may be prepared by cutting or punching layers of suitable diameter to enclose the metal rings 7 and 8 and to fit within the ring 6. Such punchings may be stacked to a suitable depth and the metallic rings 6, 7 and 8 assembled about them. The rings 7 and 8 may also be insulated from each other by employing intermediate punchings 10 of substantially the same inner diameter as the metallic rings 7 and 8 and of the same outer diameter as the other punchings of insulating material.

Furthermore, the faces of the metallic rings may be roughened, as indicated at 11, to insure a better binding action between the impregnated material and the metal. The metal rings and the insulating material may be assembled and then subjected to sufficient heat and pressure to compact the impregnated material and to harden its binder. Sufficient fibrous material should be employed to allow for compacting of the material when it is subjected to heat and pressure. When a phenolic condensation product is employed, the fibrous material may be impregnated and then dried to facilitate its handling, the binder, being then in an inert state, becomes active when subjected to further heat.

A bearing insulated, as above described, will not be affected by stray electric currents because the exterior race is sufficiently insulated to prevent currents flowing between the bearing balls and the housing of the bearing. In some cases, a non-magnetizable metal, such as copper or brass, may be employed instead of the insulating material. This is practical when it is sufficient to decrease the flux density by increasing the reluctance of the bearing.

In some instances, it may be found advantageous to employ insulating material in the inner race. In Fig. 3 is shown a bearing, similar to the bearing shown in Fig. 1, with additional insulation incorporated in the inner race. This insulation may be provided in the same manner as that described for the exterior race of the bearing shown in Fig. 1. The inner race may comprise a plurality of metal rings 12 and 13 united by insulating material 14. A bearing so constructed will, therefore, be insulated from the shaft upon which it is mounted as well as from the housing by which it is enclosed. It is obvious that the manner of constructing such a bearing may be varied by disposing insulation as seems most desirable. The inner and outer races may be divided, as desired, into various metallic rings which may be united by the fibrous material impregnated with a binder. I prefer to employ a phenolic condensation product as a binder because its mechanical strength, when hardened, more nearly approaches that of the metal, and, therefore, does not materially affect the strength of the bearing as a whole.

Although I have specifically described a bearing which may be constructed in accordance with my invention, it is obvious that, with minor changes in the construction thereof, a wide variety of bearings may be provided and I desire, therefore, that no limitations shall be imposed except such as are indicated in the appended claims.

I claim as my invention:

1. An insulated bearing comprising an inner race and an exterior race including a plurality of metallic rings, one of which is split, united by a non-conducting laminated material comprising a phenolic condensation product.

2. An insulated bearing comprising an inner race and an exterior race including a plurality of metallic rings, one of which is split, united by a fibrous material impregnated with a hardened phenolic condensation product.

3. An insulated bearing comprising an inner race and an exterior race, each including a plurality of metallic rings united by a fibrous material impregnated with a hardened phenolic condensation product.

4. An insulated bearing comprising an inner race and an exterior race including a plurality of metallic rings united by a non-conducting material, one of said rings being split transversely of its axis, and non-conducting material comprising a phenolic condensation product interposed therebetween.

In testimony whereof, I have hereunto subscribed my name this 31st day of Jan., 1919.

RANDAL E. TALLEY.